United States Patent [19]

Pryor

[11] 4,403,860
[45] Sep. 13, 1983

[54] APPARATUS FOR DETERMINING DIMENSIONS

[75] Inventor: Timothy R. Pryor, Windsor, Canada

[73] Assignee: Diffracto Ltd., Windsor, Canada

[21] Appl. No.: 134,465

[22] Filed: Mar. 27, 1980

[51] Int. Cl.³ .................. B27G 23/00; G01B 11/12; G01B 11/14

[52] U.S. Cl. .................. 356/375; 33/178 F; 33/185 R; 356/241; 356/355; 356/378; 403/16

[58] Field of Search .................. 356/345–358, 356/375–376, 381, 384, 69, 372–373, 390–393, 378, 23, 241, 377, 396; 250/560–561, 237 R, 231 SE, 237 G, 577; 408/2, 16, 116; 73/104; 33/178 F, 185 R, 125 B; 116/230–232; 353/80

[56] References Cited

U.S. PATENT DOCUMENTS

| | | | |
|---|---|---|---|
| 1,336,311 | 4/1920 | Martin | 408/116 |
| 2,249,121 | 7/1941 | Drescher | 356/392 |
| 2,303,651 | 12/1942 | Mason | 408/116 |
| 2,454,959 | 11/1948 | Zarnes | 350/23 |
| 2,614,368 | 10/1952 | Polk et al. | 356/392 |
| 2,994,962 | 8/1961 | Lebourg | 356/373 |
| 3,354,319 | 11/1967 | Loewen et al. | 250/237 R |
| 3,599,004 | 8/1971 | Grendelmeier | 250/237 G |
| 3,666,885 | 5/1972 | Hemsley et al. | 356/23 |
| 3,840,301 | 10/1974 | Pryor et al. | 356/354 |
| 3,973,119 | 8/1976 | Renes et al. | 356/396 |
| 3,983,376 | 9/1976 | Pozzetti | 408/2 |
| 4,180,329 | 12/1979 | Hildebrand | 356/23 |
| 4,190,767 | 2/1980 | Crouse | 250/231 SE |
| 4,305,661 | 12/1981 | Pryor et al. | 356/241 |

FOREIGN PATENT DOCUMENTS

| | | | |
|---|---|---|---|
| 608505 | 1/1935 | Fed. Rep. of Germany | 356/396 |
| 1279411 | 6/1972 | United Kingdom | 408/2 |

OTHER PUBLICATIONS

Pryor et al., "Laser Based Gauging/Inspection", Electro-Optical Systems Design, vol. 7, 5/1975, pp. 26–31.

Primary Examiner—William H. Punter
Attorney, Agent, or Firm—Larson and Taylor

[57] ABSTRACT

Apparatus and method for determining dimensions of an object. In one embodiment, apparatus comprises a support structure, means for positioning an object, at least one gage member having a contact portion for contacting a surface of a positioned object and an edge movable with said contact portion. The gage member is positioned in a contact position in which it is in contact, or nearly in contact, with a position object. The position of the edge is proportional to a dimension of the object between the contacted surface and a reference point of the object. The reference point may be within the object, such as an axis of rotation, or on a surface of the object. A light source is provided to direct light onto the edge and a lens is used to focus the image of the edge on a light detector comprising a plurality of light sensitive elements capable of producing an output signal in response to incident light. Means are provided to analyze the output signals to determine the dimension of the object between the contacted surface and the reference point.

22 Claims, 21 Drawing Figures

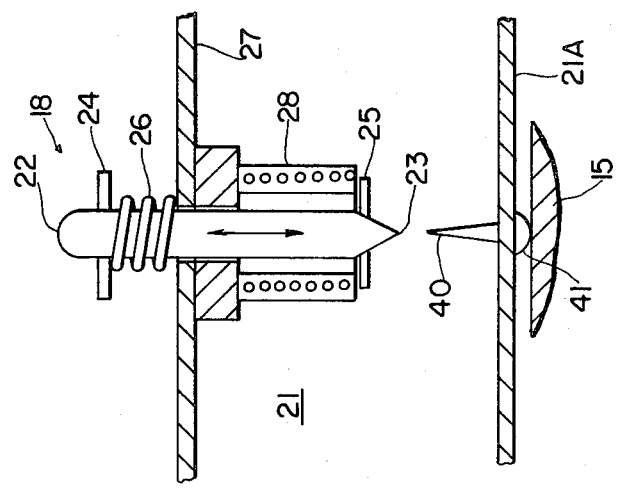
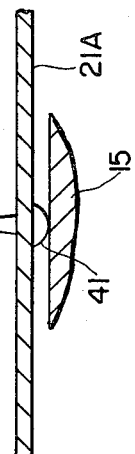
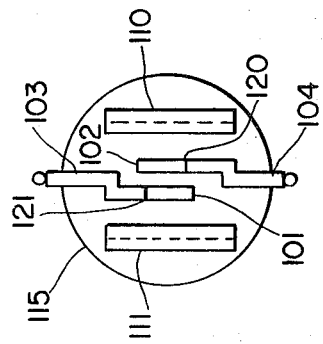
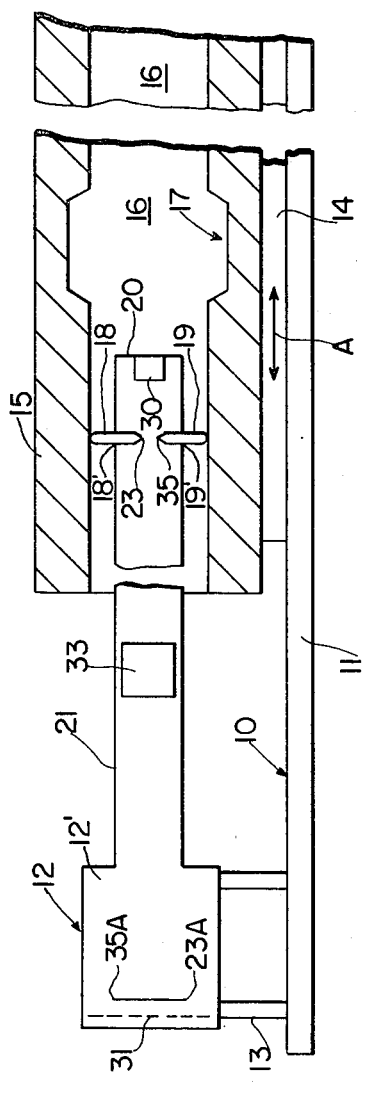
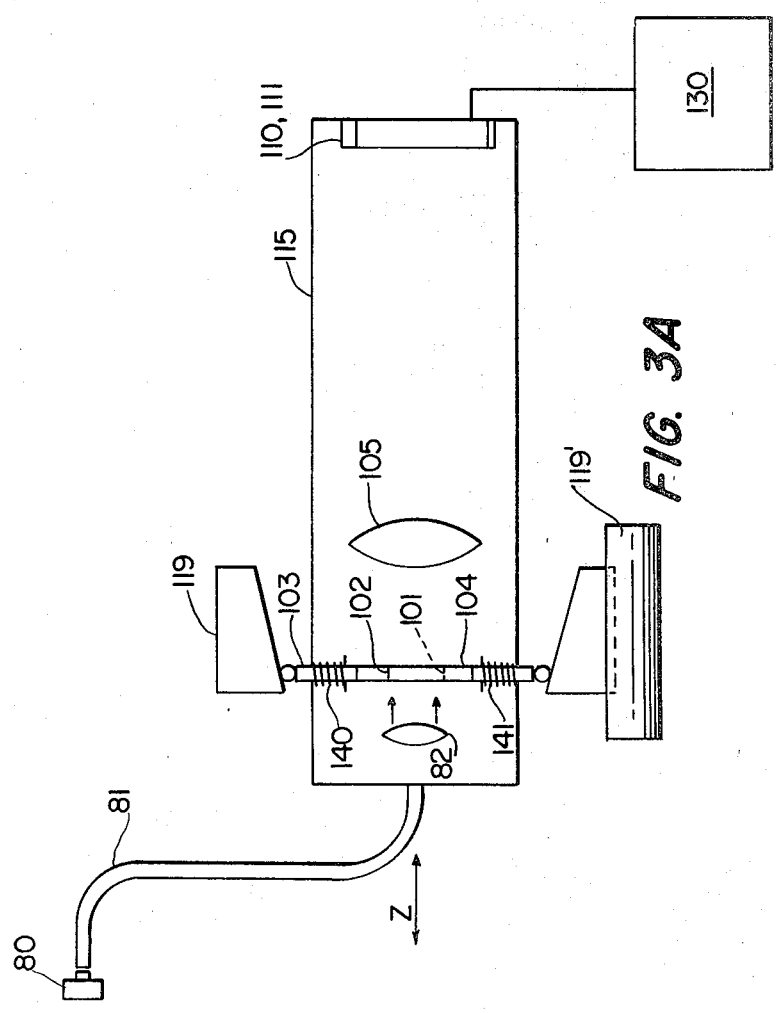

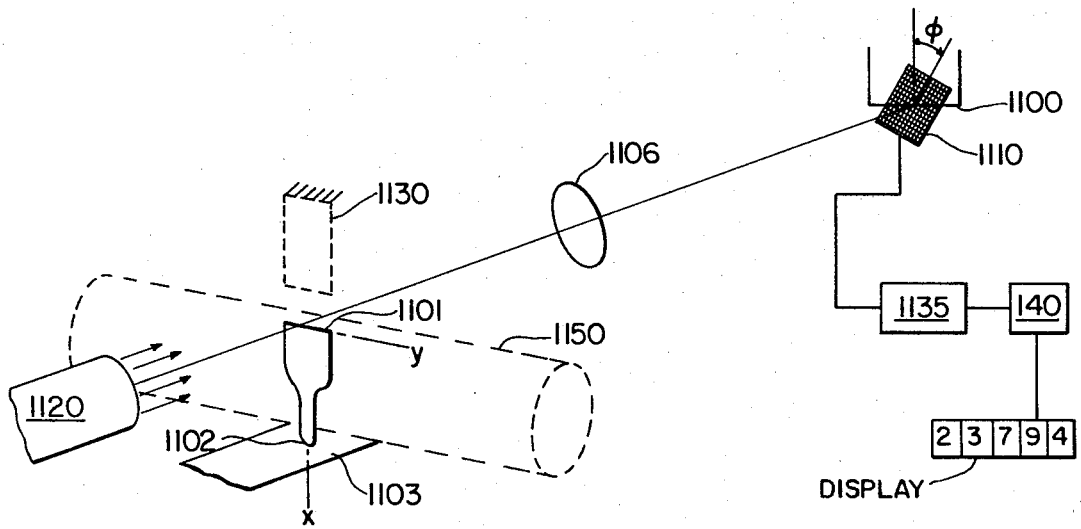
FIG. 14A
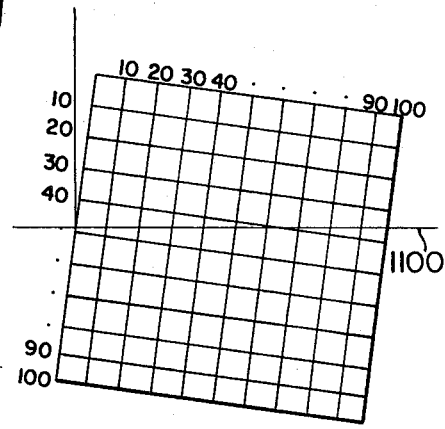
FIG. 14B
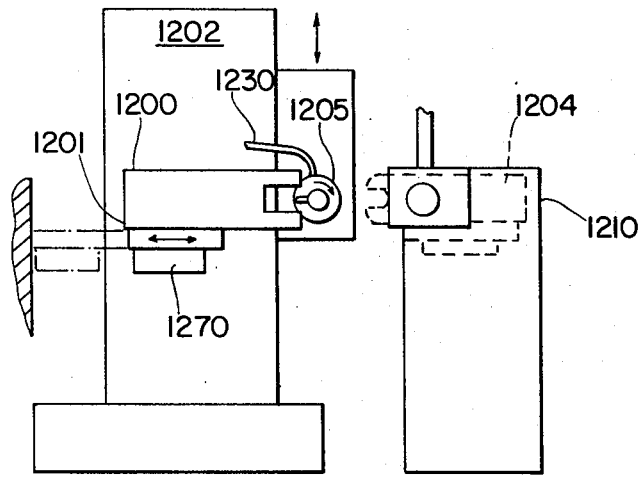
FIG. 15A
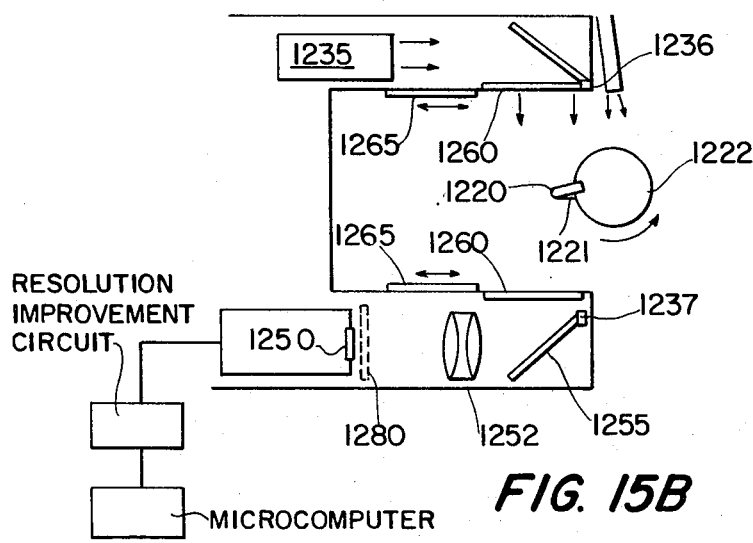
FIG. 15B
FIG. 15C

APPARATUS FOR DETERMINING DIMENSIONS

BACKGROUND OF THE INVENTION

The present invention relates to apparatus and methods for determining dimensions such as diameter, thickness, aperture size, bore size, and the like and for monitoring object dimension, tool position or tool form. At present, there are many devices for determining dimensions of various objects. For example, in modern industrial applications, it is well known to utilize contact points to transduce a dimension to an electronic transducer. In a typical application at the present time, such contact points would rountinely touch the inner diameter of an engine cylinder bore. Linear Voltage Displacement Transducers (LVDT transducers) connected to the contact members, are provided to sense the location of the contact members and thus relate to the bore diameter.

Such electronic transduction systems using contacts have begun steadily replacing the air gages previously used which utilized air back-pressure against a surface of the object as the measuring variable. These air gages have the advantage of no contact between the object and the gage. The reason for the replacement of air gages is the much higher range, stability and maintainability of the electronic sensors which advantages offset the disadvantages caused by use of contact rather than non-contact measurement.

It is an object of the present invention to provide apparatus and methods for determining a dimension of an object and for monitoring object dimension, tool position and tool form in working on an object. It is a further object of the invention to provide such apparatus and methods which has advantages over the previously known devices and methods, such as those mentioned above, and which over-come several of the disadvantages thereof.

BRIEF SUMMARY OF THE INVENTION

The foregoing and other objects which will be apparent to those of ordinary skill in the art are achieved in accordance with the present invention which provides, in one embodiment, apparatus for determining a dimension of an object, the apparatus comprising a support structure, means for positioning an object, a gage member mounted on the support, the gage member having a contact portion for contacting a surface of a positioned object and having a portion movable with the contact portion and comprising an edge, means for positioning the gage member in a contact position in which the contact portion is in contact with the surface whereby the edge position is proportional to a dimension of the object between a reference point of a positioned object and the surface of a positioned object contacted by the contact portion of the gage member, light source means for directing light onto the edge, light detector means comprising a plurality of light sensitive elements, each of the light sensitive elements being capable of producing an output signal in response to incident light, lens means for focussing an image of the edge on the light detector means, the image being formed by the light directed onto the edge, and means for analyzing the output signals from the light sensitive elements to determine the dimension between the reference point and the surface of a positioned object.

In one embodiment, the further edge is provided in a second gage member mounted on the support structure and having a contact end portion adapted to contact a second surface of an object and a non-contact portion movable with the contact portion and comprising the further edge, and the second gage member is also movable between withdrawn and object-contacting positions such that the edges of the first and second gage members are spaced apart a distance between the object surfaces contacted by the gage members. Thus, the apparatus is adapted to determine the distance between the contacted surfaces. The surfaces may be outside surfaces, whereby outside dimensions such as thickness may be determined, or inside surfaces, such as bore surfaces, whereby inside dimensions, such as bore diameter may be determined.

In another embodiment, the object is positioned such that a reference point—which may be in a surface, along an axis of rotation, or elsewhere—of the object is in a reference position. In this embodiment, the further edge is a reference edge positioned at a known distance from the reference point of a positioned object. When the first gage member is in its object-contacting position, the distance between the edge of the first gage member and the reference point is proportional to the gap between the edges. The apparatus is thus adapted to determine the distance between the reference point and the contacted surface of a positioned object. This embodiment has particular adaptability to apparatus in which the object is rotated relative to the gage member in which case the reference point is preferably the axis of rotation.

In a further variation of the embodiment just described, an elongate gage member is provided with a plurality of edges spaced apart known distances from one another all of which edges move with the contact portion of the gage. In this embodiment, the image of the edge spacing varies with the position of the gage member and thus provides an indication of the position of the contact portion of the gage member and thus of the surface contacted thereby.

In a still further embodiment there is provided means for monitoring object dimension, tool position or tool form in apparatus for working on an object with a tool which comprises a tool and means for supporting, in a working position, an object to be worked upon by the tool. The monitoring means comprises means for directing, during normal operation of the apparatus, electromagnetic radiation onto an edge of a member which contacts the portion of said object which is worked on to form a pattern of electromagnetic radiation which is characteristic of the position of said edge in the electromagnetic radiation directed thereto, and means for analyzing said pattern to determine the object dimension, tool position, or tool form during normal operation of the apparatus.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment of the invention and that the invention is capable of numerous modifications and variations apparent to those skilled in the art without departing from the spirit and scope of the invention.

FIG. 1 is a diagrammatic side elevation view, partly in section, of a first embodiment of the invention;

FIG. 2 is a diagrammatic side elevation view, partially in section, of a portion of a second embodiment of the invention;

FIG. 3A is a diagrammatic side elevation view of a third embodiment of the invention;

FIG. 3B is a diagrammatic end elevation view of a portion of the device of FIG. 3A;

FIG. 3C is a diagrammatic side elevation and enlarged view of an alternative type of "edge" member useful in the invention and in the embodiment of FIGS. 3A and 3B.

FIG. 14A is a diagrammatic perspective view of a further embodiment of the invention;

FIG. 14B is an elongate diagrammatic view of a portion of FIG. 14A;

FIG. 15A is a diagrammatic side elevation view of a further embodiment of the invention;

FIG. 15B is a diagrammatic side elevation view of a portion of FIG. 15A;

FIG. 15C is a diagrammatic top view of FIG. 15B.

Figure 4A:
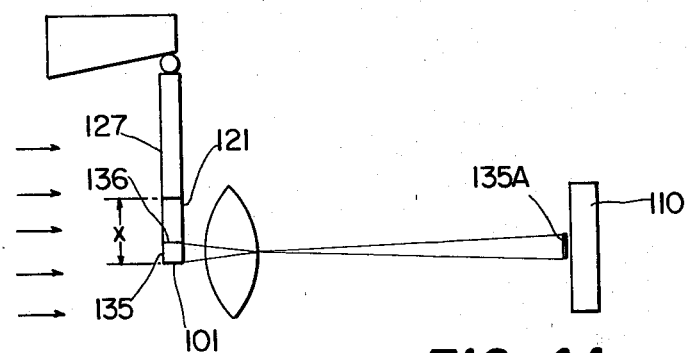
FIGS. 4A and 4B are diagrammatic side elevation views showing a multiple edge gage member in accordance with the present invention.

With reference to FIG. 1, apparatus according to the invention includes a support structure 10 including a stable base 11, a housing 12, legs 13 for securing housing 12 to base 10 and a slide member 14 movable horizontally in the direction of arrow A in a track (not shown) in base 11. Slide 14 is used to position an object 15, in this case a tubular member having a bore 16. Bore 16 has a nominal constant diameter except for groove 17 provided at a point along the bore wall, the bore wall surface at groove 17 having an increased diameter. Object 15 is secured to slide member 14 in any convenient manner such as by screws or clamps (not shown) and is preferably releasably secured thereto.

Two gage members 18, 19 are mounted on housing 12 and are movable through apertures 18' and 19' at the distal end 20 of an elongate tube 21 forming a part of housing 12. As shown in FIG. 1, gage members 18, 19 are movable through apertures 18', 19' provided adjacent the distal end of probe tube 21. Each gage member is elongate and has a contact portion at its outer end for contacting the bore wall surface and a noncontact portion at its other end movable with the contact portion and comprising an edge. The edges of the two members are spaced apart forming a gap therebetween. As shown in FIG. 2, the gage members are conveniently cylindrical with one end 22 rounded for contacting the surface of a positioned object and the other end 23 provided with an edge which may be integral or a separate member, such as a knife edge, attached to the other end of the cylindrical gage member.

As shown in FIG. 2, (in which only gage member 18 is shown) each gage member is elongate and bears a flange 24 adjacent its rounded contact end and a flange 25 adjacent its edge end. At least one of flanges 24, 25 is removable to facilitate assembly. A spring 26 urges gage member 18 outwardly of tube 21 into a contact position in which contact portion 22 is in contact with a surface of a positioned object. Flange 25 acts as a stop to limit the outward motion of a gage member 18. Gage member 18 thus has an operable length, in the depicted embodiment, approximately equal to the distance between outer wall 27 (FIG. 2) of tube 21 and flange 24. Spring 26 is chosen so as to urge gage member 18 against the surface of a positioned object. A solenoid coil 28 surrounds gage member 18 and is provided with electrical energizing means not shown. Gage member 18 is magnetic, or bears a magnetic element, adjacent coil 28 and the magnet is arranged such that on energizing coil 28, gage member 18 is drawn inwardly into tuber 21 to a withdrawn position in which contact portion 22 is out of contact with the surface of a positioned object with which it was previously contact. Flange 24 limits the inward motion of gage member 18.

Gage members 18, 19 are sized such that, in use, a gap is formed therebetween. When gage member 18 is moved into its contact position, the gap formed between the edge of member 18 and the further edge is dependent upon the distance between the contact portion of the gage member and a reference point on the object. Thus, the gap provides a measure of the dimension between the contacted surface and a reference point on the object. In the embodiment of FIGS. 1 and 2, the reference point is a point on the bore wall diametrically opposite to the point where gage member 18 contacts the bore wall. The reference point is thus the contact point of gage member 19. The gap formed between the edges of members 18, 19 is thus proportional to the diameter of the bore. A bearing is provided to facilitate movement of pin 18 radially through tube wall 27. The gage members are thus mounted in housing 12 for diametrically opposite movement between the contact and withdrawn positions.

Referring again to FIG. 1, a light source 30 is mounted at the distal end 20 of tube 21 and positioned to direct light onto the edges of members 18 and 19. Light detector means comprising a plurality of light sensitive elements 31 are provided in an enlarged portion 32 of housing 12. A lens 33 is also mounted in housing 12 to focus an image of the edges of gage members 18 and 19 onto the light detectors 31, the image being formed by the light from light source 30. A suitable light source is a light emitting diode such as an infra-red LED (RCA SG 1009). A suitable lens is a camera lens such as Canon 50 mm f 1.8, and a suitable light detector is a linear photodiode array commercially available as RL 1728 H.

In an alternative arrangement, object 15 is mounted in fixed position on a support member 14 which is in turn fixed to base 11. Housing 12, or at least probe 21 thereof, is mounted for movement relative to bore 16. For example, legs 13 could be mounted in tracks (not shown) extending lengthwise of base 11.

In addition to the solenoid actuated retract and engage system of FIG. 2, there are several other actuation scheme that also can be utilized—air, vacuum, levers, cams, etc. All of these are relatively well known per se and it it noted that all of them can be applied to this invention easily because of the fact that none of the menas for transduction are located anywhere near the points being moved. This means for example that high electrical current solenoids can be used to move the pins without signal disturbance as in conventional LVDTs.

While the embodiment of FIGS. 1 and 2 above is shown using pin retractors which provide for reduced wear on the pin ends, the invention does not require positive retraction of the pins. For example, the pins can be moved inwardly by their movement into the part due to the linear motion of probe 21 as it goes into the bore. This is readily done by tapering the ends of the pins so as to provide an easy entry into the bore. Naturally, however, the taper angle cannot be too steep or the pin will tend to hand up and therefore, for large variations or for interruptions in the bore, retractors are desirable.

It is further noted that the gage members shown do not need to be in contact with the surface except for the brief instant required to take the reading with a high speed diode array scan. This means that the retractors can be utilized even though the probe is spinning without fear of substantial binding and shear wear on the probe tips. It is only necessary to read the diode array at the point at which the probe deacceleration reaches zero as it is driven in against the bore wall, for example in the example of FIG. 1. Thus it is entirely within the invention to rotate the probe and diode array combination of FIG. 1 while the measurement is taken by simply firing the pins out, say every 30°, to obtain cylindricity data.

Particularly apropos for a multiple pin retractor system is the use of air or vacuum to force all the pins out against the wall of a bore, for example, by pressurizing the total probe chamber. This means that the total probe is sealed off and everything is pressurized therein.

It is noted that the LED light source 30 shown in FIG. 1 could be located remotely and conveyed to the position shown in the figure using a fiber optic light guide. Indeed any sort of light source could be conveyed with the fiber optic, and these concepts are discussed below relative to FIGS. 9, 10 and 11. It is further noted that the light source is not at all limited to LED's, although they are attractive from their small packaging and long life point of view. Tungsten bulbs, diode lasers, gas lasers and every sort of light source will function in this invention.

It is noted that the position of edge 23 of member 18 and edge 35 of member 19 can be monitored independently since the image points 23A and 35A can be individually sensed on the photo diode array 31. This feature allows one to look for not only diameters (essentially the combined reading of image 23A point and 35A) but also for radial data such as roundness, etc. from either of the two edges independently. Of course, one can make a radial probe only or an axial probe only by simply eliminating one of the members such as 19.

Note that in FIG. 1 the edge points 35A and 23A are shown inverted from those of 18 and 19 because of the inversion due to the lens 33. Naturally, in other lens systems combining two lenses for example, the images could be righted.

It is further noted that the two edges themselves to not necessarily have to be those of opposite pins touching the bore wall to achieve this. For example, if one were to eliminate pin 19, one would clearly then have only the image 23A on the photo diode array 31 and one would be measuring the position of edge point 23 and therefore the end of the pin 22 against the bore wall. This measurement would be relative to the optical axis of the lens system which, therefore, forms the line on which cylindricity data of the bore is referenced. In many applications, however, it might be desirable to have a local reference for the pin location reference to the probe axis rather than the lens axis, although these are usually one and the same. In this case, an opposite edge point such as that of member 40 shown in FIG. 2 attached to the probe wall 21A can provide such a local reference, and this allows the measurement to be made even though the bore probe itself might deflect relative to the optical axis. Under normal cases, such deflection would not be desirable. However, the feature just described does not provide a means for allowing a flexible bore probe to be made which would follow a curved bore and still provide accurate data. In that case, for example, an additional probe contact 41 could be fixed to the outside of the probe wall 21A and contact 41 would then follow the bore surface 15 as shown. In this way the whole probe itself is referenced on one side to the bore wall while the sensed point 22 follows the contour of the opposite side.

It is noted that this invention can not only be used for round bores but also for bores such as those in microwave guides and other channels, etc.

It is also noted that the separation of the image points 35A and 23A depends not only on the spacing between the points 23 and 35 of members 18 and 19, but also on the magnification of the lens system 33. Clearly, the more magnification, the more resolution one might expect from the system if suitable circuitry is available to find the edge of the image as the slope of the image degrades, in other words, as it becomes less and less clear at which point the edge lies. In most applications, the magnification of anywhere from one to 1:1 to 20:1 is utilized with the area 5:1 to 12:1 being approximately the optimum case for most applications.

In addition to the optical magnification, electronic magnification of the diode array signal can be used to improve the resolution of the system beyond the simple number of elements in the array times the magnification. Such a circuit has been disclosed in my copending application Ser. No. 269,614, filed June 2, 1981, which is a continuation of Ser. No. 073,226, filed Sept. 7, 1979, the disclosure of which is hereby incorporated by reference.

The examples above have functioned by monitoring the position of a single edge of the gage member in contact with the part, and this is the most common case. However, the invention goes considerably beyond this in that sets of multiple edges can be utilized to extend the range and/or improved the resolution of the system. An embodiment incorporating this, together with a unique arrangement of the diode arrays and pins, is shown in FIGS. 3A and 3B.

As shown therein a problem arises when it is decided to contour the inner diameter of a roller bearing cup 119 (i.e. outer raceway). This is a famous measurement problem to which no sensor to date has ever been known that could measure the diameters at all points along the tapered surface. The reason for this is that one needs both a range of 0.3 in. typically and a resolution of 10 millionths of an inch. This has been totally unavailable heretofore.

FIGS. 3A and 3B also illustrate another feature of the invention insofar as it relates to analysis of cylindrical openings: namely, the elongate probe tube is relatively rotatable with respect to the object. For example, as shown in FIG. 3A, the object may be rotated by a pair of driven rollers 119' on which cup bearing 119 is mounted.

In the arrangement shown, multiple edges are utilized, though it is noted that the invention can actually accomplish this measurement using a single edge as described relative to FIG. 1. First let us consider the operation in a single edge mode. In this case, the light from a remotely located light emitting diode 80 passes through fiber 81 and is collimated by lens 82, illuminating both edges 101 and 102 of the contact pins 103 and 104 which in this case are made to stagger one above the other. This stagger allows them to clear each other as they move in and out. The stagger also makes better use of the LED and/or figer optic light field, which is actually circular, because the zone over their travel is illuminated. It further makes best use of lens 105 which images the edges onto diode arrays 110 and 111 which are also staggered in like manner but, of course, spaced farther apart due to the lens magnification. As shown, due to the lens inversion, the image edge 101 is sensed by array 110 and edge 102 by array 111. Cylindrical housing 115 supports the above items.

In this example, each array is used to track the position of one of the edges and the difference of the edge positions gives the diameter. Each edge individually can be monitored to give the concentricity data relative to the centerline of the movement of the probe in and out of the bearing cup 119 in the z (axial) direction.

Figure 4B:
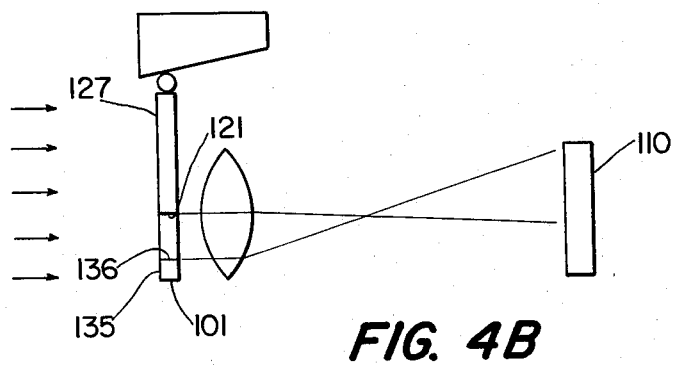

Now let us consider, as illustrated in FIGS. 4A and 4B, the use of an additional edge 121 spaced away from edge 101 and formed by vacuum deposition on a glass substrate 127. Since each pin position is monitored by an individual array, it is sufficient to consider the movement of one pin and edge.

If we now look at the operation, it is clear that as edge 101, for example, goes off the diode array 110 due to extension of the pin, the edge 121 will still be on the array. The microcomputer circuitry 130 recognizes this and adjusts to track edge 121 instead of edge 101 when edge 101 is a preset distance from the end of the array. Measurement accuracy is maintained since the degree of offset, i.e. the spacing between edges 101 and 121, is precalibrated, and can in any case be determined when both edges are on the array.

It is noted that with appropriate logic, an absolute measurement system is provided since the width of the strip 135 having edges 101 and 136 is obviously different from the solid area behind edge 121 and can be recognized. Similarly, range can be still further extended in absolute fashion using multiple edge strips such as strip 135 with image 135A, each of which has a different width of the strip or spacing between each set, such as "x" between edges 101 and 121 is within the length of the diode array considering the lens magnification.

It is noted that this range extention comes without having to have a large light field and that it is operating in an absolute manner totally unlike Moire grid types commonly used for incremental encoders. We are actually scanning the image of the multiple edges and deciphering the absolute position of the contact.

It has been noted that either the spacing or width of the strips may be coded as to provide an absolute measure of the location of the edge points. For example, a double strip of two lines of different spacing can be used to denote the beginning of the cycle presently in view. The diode array circuitry 110 only looks, for example, at the left hand edge in making the measurement, and uses the code signal in the microcomputer 130 to look up in a table to tell which edge set it is looking at.

Naturally, the whole scale system, including light field irregularities, lens magnification aberation, etc., can be calibrated to obtain the exact points at which these edge positions occur as a function of contact location on the part.

It is further noted that the use of multiple edge positions, each sensed by the array of known absolute spacing, provides an additional increase in resolution of the array output circuitry. This is described further in connection with FIG. 12.

Another advantage of using the multiple line grid is that it improves resolution and/or range for any given size diode array, or allows a reduction in diode array cost or size. For example, if a system was comprised as in FIG. 4A, but only edge 101 were monitored, range would be 0.100" and resolution would be 0.0001" for lens magnification of 10× and a 0.001" element to element spacing of the array. Appropriate multiple threshold circuitry can extend this resolution and, in the absense of same, one can extend resolution by going to higher lens magnification of say 20:1 In the present context, this would cut range to 0.050". However, if a dual edge system is used (e.g. edges 121 and 101) the range is extended to 0.1". Similarly, a 5 edge system could provide 0.50" range, etc. Quite obviously, the circuitry to handle which edge is that circuitry which could probably functionup to at least 50 edges (on a 1000 element array). Thus, range could be 2.5" at 20×. The more closely spaced the lines, the smaller the light field has to be—a desirable feature at high magnification.

As shown in FIG. 3C, pin 103, designated 103' in FIG. 3C, may be provided with a grating 121' in which the lines are spaced apart at progressively increasing intervals. In this embodiment, microprocessor 130 is provided with circuitry for detecting the magnitude of the spacing between the images of two adjacent lines of the grating.

It is further noted that the pins shown in FIGS. 3 and 4 are, in this case, spring loaded by springs 140 and 141 against the part with no retractor mechanism such as illustrated in FIG. 2. As the probe is moved in the z direction into the part bore, the ball contact slides into the bore due to its taper. Naturally the fully extended pin can be only slightly bigger than the part bore if such a lead-in is to be effective.

Figure 5:
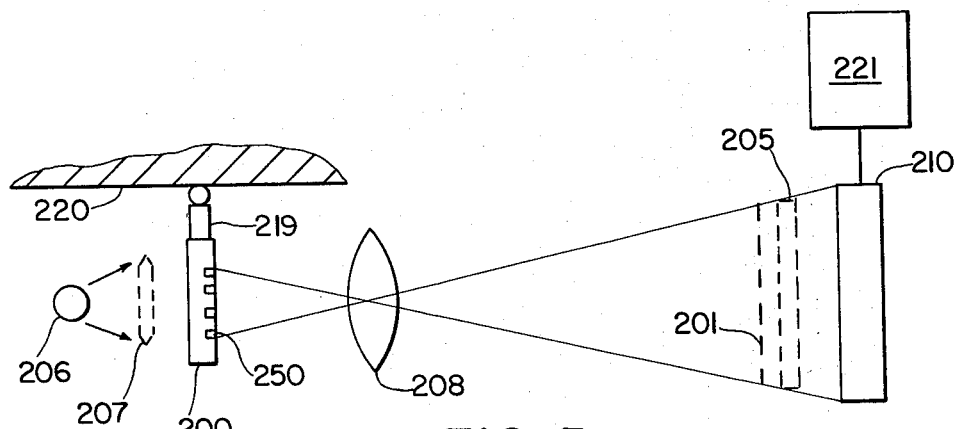
FIG. 5 is a diagrammatic view showing an alternative type of multiple edge gage member in accordance with the present invention.

Another multiple edge embodiment is shown in FIG. 5 which illustrates a vernier type system using grating 200. In this case the line widths and spacing of this grating are equal rather than unequal as shown in FIG. 5A, pin 219 designated 219' in FIG. 5A, may be provided with a grating 200' in which the lines are spaced apart at progressively increasing intervals. In this embodiment, the microprocessor is provided with circuitry for detecting the magnitude of the spacing between the images of two adjacent lines of the grating. Their image 201, provided by lens 208, is compared to another grating 205 such that the vernier effect is provided with the location of the correspondence between the lines occuring across the field at some location. Incandescent filiment source 206 provides illumination which can be optionally collimated by lens 207.

It is noted in FIG. 5 that the dark lines of contact pin member grating 200 and reference grating 205 are not totally opaque. In this manner, the sensed signal on the photo diode array 210 only goes effectively to extinction when the lines of the grating image 201 coincide with those of grating 205. In this manner, the location of the vernier correspondence point can be sensed using a low level threshold trigger.

Two thresholds of electrical interrogation at a minimum are utilized. The first threshold is utilized to find the edge of grating 200 which is simply sensed by the diode array as a digital signal and utilized to track the rough movement of the grating and therefore pin 219 in contact with part surface 220. A second, low level, threshold is utilized to find the vernier correspondence point. This threshold is located very close to the zero light portion though not so close to be in the noise level of the array. It senses location where the two grating lines exactly coincide (within the system resolution). This alternatively can be characterized as the point where the two gratings "beat" together.

This particular approach offers considerable resolution enhancement. As discussed below, it is noted that the reference grating 205 can actually be created electronically and compared to the outputs of the diode array on a frequency or other basis. A consideration with any such vernier system, however, is that to work it requires the full width of the grating image to be on the diode array, with accordingly less range.

Let us consider the electronic vernier operation mode. Assuming grating 205 is removed, the frequency output of the diode array sensing grating image 201, plus the location of the first edge point 250 (which is the tracked fiducial mark) is fed into comparison circuitry 221 which could include a phase lock loop. The point at which the phase of the internally generated signal matches the signal from the array scan of the grating image is detected as the vernier location of the additional increment of position (beyond the rough resolution of point 250, detected by a strict diode array count basis).

In summation, therefore, if we consider in FIG. 3 that instead of a single point we would move a whole periodic grating image across the field of the diode array, (keeping all lines on the array) we would see that we would be able to achieve at least 10 times the resolution due to the vernier effect. However, because we were forced to use the whole length of the grating, our range would drop a factor of 10. Therefore, we would have to use, for any given measurement, 10 times the length of edges in order to see what we were doing. Therefore, to achieve the same range one would have to cut back the lens magnification which also cuts back the range and therefore yields an equivalent system. It should be noted, however, that there are certain cases where such vernier type can be effective: namely, in those cases where a lens magnification is not desirable as a means of achieving resolution and where little range but very high resolutions are required. Such high resolutions are possible as vernier magnification of 20:1 or better can be achieved with accurate phase comparision circuitry.

Figure 6:
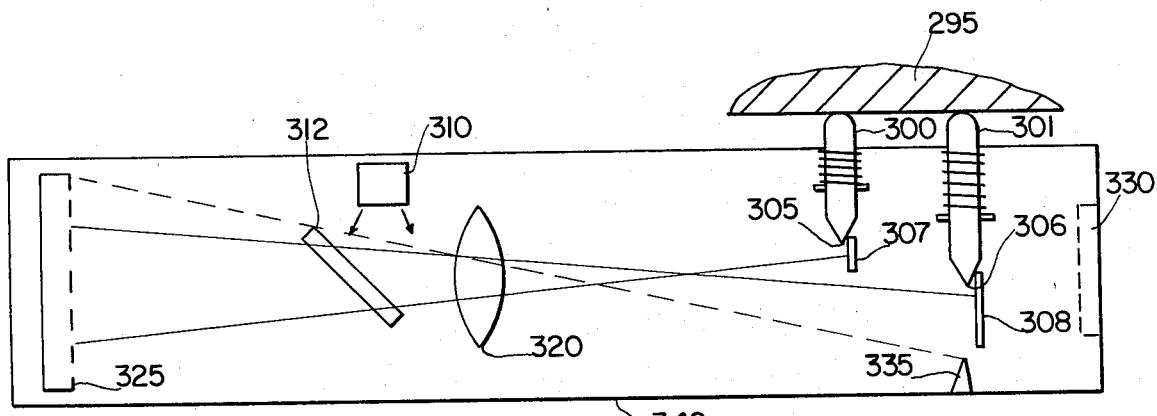
FIG. 6 is a diagrammatic side elevation view of a fourth embodiment of the invention.

The FIG. 6 illustrates another arrangement of the invention for measuring the relationship of points long a line of a part 295 simultaneously. In this case, pins 300 and 301 are arranged in the direction of the optical axis and to further illustrate another embodiment, each of the pin edges 305 and 306 has a tiny reflective mirror 307 and 308 on it. Thus it is the edge of the mirror that is measured and not the transmitted light. This is generally not as desirable but again often becomes a necessity when certain packing arrangements are to be made. In the illustrated case, for example, where it is desirable to have a light source 310 at the same end of the probe as the array 325 via beam splitter 312, lens 320 forms an image of each edge onto a single diode array 325. In this case, the range of diode array is used to look at all the pins together, however, it's obvious that each of the pins can only have a range much less than this if it is not to be masked by one or other of the probes. This is useful when one of the probes must be considerably different length than the other, or where the measurement must be taken simultaneously. It is noted that in a similar situation, a mirror 330 (shown in dotted lines) can also be put behind both pins. With such an arrangement, the pins would have to have slots cut into them for the light to come through from behind and hit the next pin edge in succession, which is a little more cumbersome. To illustrate another point, note that array 325 can also be used to monitor the position of reference edge 335 fixed to probe body 340. This allows the position measurement of pin 301 to be locally compared, rather than using the optical axis for reference.

Figure 7:
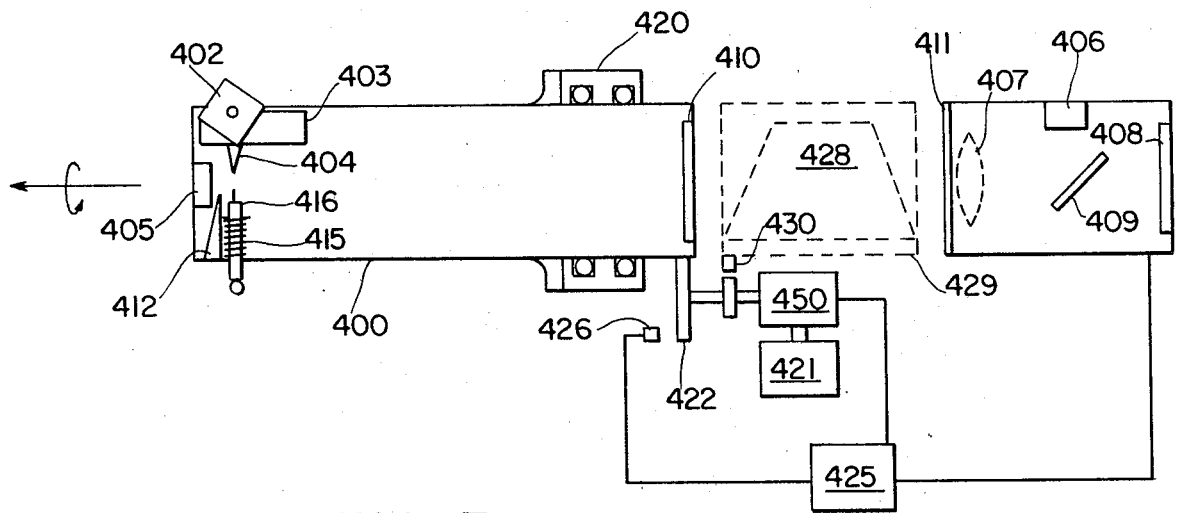
FIG. 7 is a diagrammatic side elevation view of a boring tool incorporating a monitoring means in accordance with the present invention.

The FIG. 7 illustrates the application of this invention to measurements taken in a similar manner to the embodiments above but on actual cutting tools. For example, consider a boring tool comprised of a boring bar 400 mounted in bearings 420 and having a cutter insert 402 in a holder 403 having a rear edge 404, and a mirror 405. In this particular example, this boring bar 400 has been instrumented through windows 410 and 411 according to the invention using a remote light source 406, a lens 407, a beam splitter 409 and a diode array 408, so as to monitor the rear edge of the cutter relative to the optical axis or through the use of local edge reference 412 to the end of the boring bar. Such monitoring allows one to pick up the cutter position in space as well as deflection of the bar itself relative to the optical axis fixed onto the machine.

An optional pin 416 can also be put on to allow the measurement of radius independent of the cutter for checking a bore during the actual cutting process. The pin can also be seen in the same diode array lens magnification along the lines shown above.

Similarly, a pair of integral opposing pins can determine diameter as discussed previously. Alternatively, they can be located orthogonally at 90° in the circumferential direction and a separate diode array utilized but with the same lens and light source system.

The cutter bar in this case can be used in a turning operation where it is stationary, but it is of interest now to consider monitoring during rotation used in boring.

One of the advantages of this arrangement is that the cutter can be rotated in its bearings 420 under power of motor 421 driving through gear 422 but the measurement can be made with no physical connection between the sensing portion represented by the lens, array, light source, etc. and the rotating portion. This is not possible with other systems that measure such displacements, etc. using electronics or air.

This advantage brings the chance to monitor the cutter while it is rotating by picking off the point at which the array is in position and firing the diode array. Thus, for example, in the version shown, the diode array readout control unit 425 picks off via sensor 426 a control pulse from the gear 422 and fires the reading at the point at which the edges are lined up such that the image falls on the diode array.

This firing of the data can be done by either pulsing light source 406 with a very short pulse or by simply restrobing the readout of the diode array. The short pulse technique is preferred to "freeze" the motion if very high rotational speeds are utilized.

One of the other features of the gage is to monitor the position of the cutter or the bore diameter throughout the total 360° cycle not only in this particular embodiment, but in other embodiments that might be used to simply gage bores for cylindricity for example. In this case an example is shown in which a dove prism 428 in housing 429 is driven by gear reducer 430 at half the rotational speed of the cutter such that the image of the cutter edge appears stationary on the diode array even though it is rotating throughout is 360°. Alternatively, a similar mirror arrangement to the dove prism can also be used to accomplish this image derotation. It is also possible to approximate a full 360° monitoring by having a diode array 408 comprised of radial lines of detector elements at circumferential increments, i.e. every 5°.

While the examples above have all shown the use of imaging type optics to form an image of the cutter edge or the like on the diode array, it is noted that diffraction operating systems such as mentioned in many of my previous patents can be also utilized advantageously. These diffraction systems are described in my earlier U.S. Pat. Nos. 3,797,939; 3,840,301; 3,843,261; 3,883,249; 3,884,581; 3,994,584; 4,009,965; 4,131,365; and 4,168,911; the disclosures of which are herein incorporated by reference. For example, in the system shown in FIG. 7, if the lens 407 were removed the system would operate in the diffraction mode. In this case, of course, the light source 406 would be assumed to be a collimated diode laser for example and the diode array would be looking at the diffraction fringes produced by diffraction waves from the edge of the cutter member 404 and some other edge such as the opposed edge reference 412 or the edge 416 of the pin 415. In the diffraction case, two edges are required to produce the pattern.

It is also of interest to note that being able to monitor the cutter position 360° through rotation allows the control unit 425 to sense the onset of chatter by detecting the minute, high frequency movements of the cutter and therefore slow the rotational speed or the inward feed rate in the z direction such that the chatter is eliminated. By suitable finesse, the control system can also control the cutter coolant flow and look for problems encountered due to poor metal conditions in the bore, etc. This is particularly true if the control is also linked into a torque sensor such as 450 in the drive train from the motor 421.

It is also a part of this invention to provide useful means to monitor the edge of the cutter, even if it is spinning as it is withdrawn from the part. This is done in order to achieve a calibration as to where the cutter is and the amount of tool damage. Tool wear is also determined using the invention to determine both the rear position and the front position of the cutting point.

Figure 8:
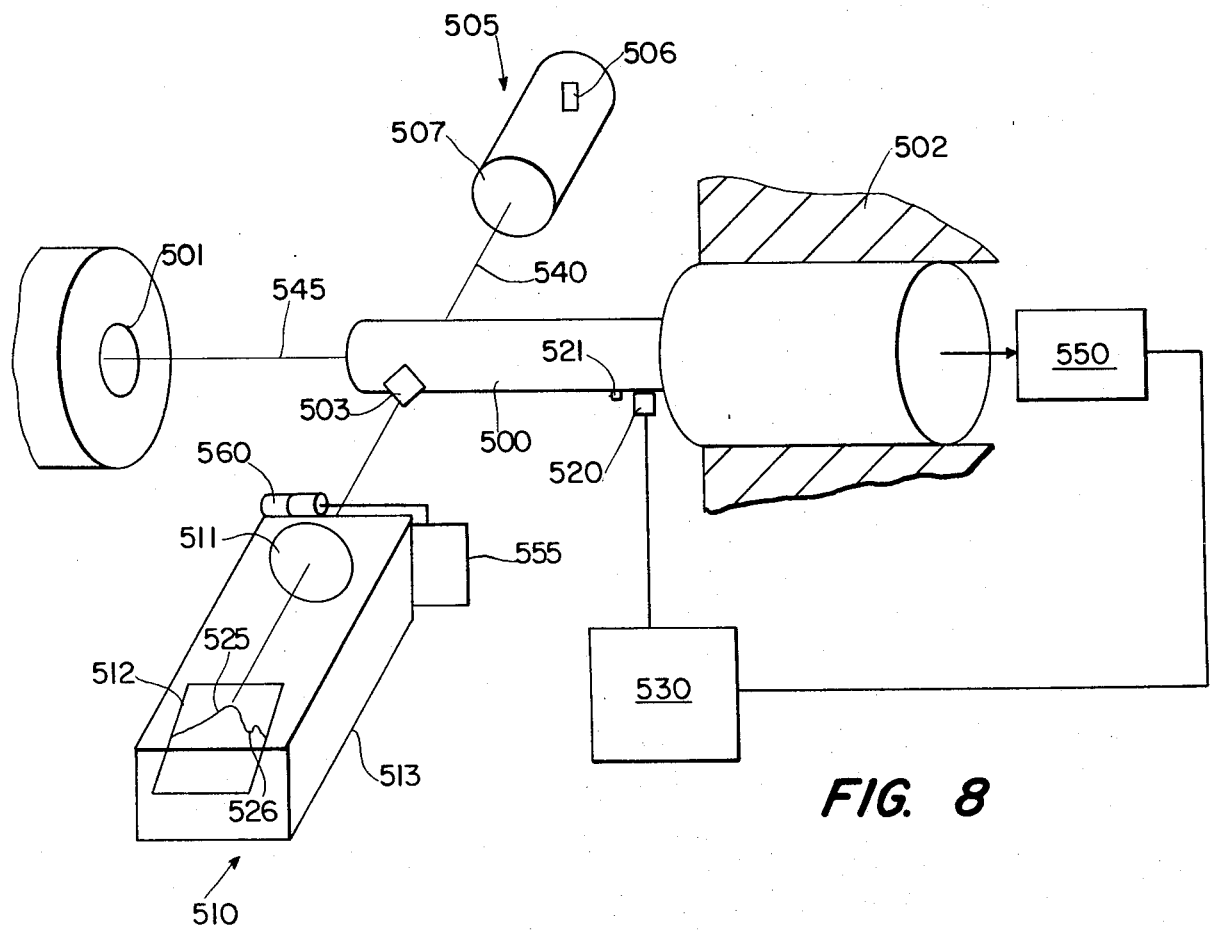
FIG. 8 is a diagrammatic perspective view of a boring tool incorporating a further monitoring device in accordance with the present invention.

As shown in FIG. 8, a square matrix photo diode array sensor 512 is used to find the exact edge of the cutter even though it is spinning by using a flashed light source 505 to freeze the position of the cutter at the correct time in the rotational cycle.

In this example, boring bar 500, rotating on bearins not shown, is withdrawn from work piece 501 by slide 502, a portion of which is shown. When the boring bar having insertable cutter 503 is returned to its home position, it comes within the range of the sensing equipment comprising a flashed light source 505 which in this case comprises a pulsed LED 506 and a lens 507, and a sensor unit 510 comprised of lens 511 and matrix photo diode array 512 all housed in housing 513.

At the correct point, a pulse is taken from the rotating bar by sensor 520 sensing flag 521 on the bar and this causes the strobed light 505 to fire when the cutter is in the bottom dead center position. At this point, the image 525 of the cutter is formed on the diode array. Next, the control unit incorporating microcomputer 530 causes the diode array to be scanned out to find the high point of the cutter, which in this case is the cutting edge, and its dimension from the reference axis 540 of the sensor light source unit. This reference is locked to the base of the machine containing slide 502 and the rotation means and is assumed to fix the point at which the cutter is positioned relative to the center line 545 of the boring bar which also has its center of rotation.

At this point, the comparison is made between the cutter position sensed and that which is correct for the work to be bored. If there is any deviation, a control signal is sent to the spindle compensating module 550 which can be one of any number of brands on the market which feeds a compensation signal moving the cutting or the whole boring bar into position such that the cutter tip is now in correct location. After the compensation is performed, the inspection cycle is again performed and the position verified. It can well be that this new position is actually verified relative to a diameter check made at inspection station downstream.

This particular embodiment of the invention provides a very great step forward in such compensation schemes because, in general, there is no way to tell at the point of compensation whether the spindle compensating mechanical action has been correctly applied. This is solved by the invention which "closes the loop" on such control systems, besides providing additional information as to wear, damage, etc. (For example nick 526 of cutter detect on image 525).

It is noted that the invention can be used with single point tools such as that shown, or multiple point cutters in which the cutting edges of each are sensed during one revolution (using multiple sync pulses from multiple flags 521). In addition, the same basic approach works on boring bars such as engine cam boring bars which have multiple cutters in an axial row (2 axis) but are generally not rotating on retraction. In this case a circumferential timing pulse from sensor 520 is not required but each is monitored in turn as the bar is axially retracted. In the cases where very large radial range is required (typically 0.080") because of the different cutter heights and a linear array can be used in place of matrix 512 as the 2 axis scan, motion is already provided by the retraction of the bar itself.

The invention as shown can also measure form of the cutting edge and detect chipped out sections and other deformaties, and then signal for a tool change as needed. This is particularly of interest with ceramics, etc. Also of interest is that the invention as shown here can be used to set up the cutters in the first place, either on or off the machine. In this case the operator simply adjusts insert height until the detected array signal is at the desired location (usually set into the controller).

The environment around the sensor is commonly filled with coolant and chips, although it is noted that the coolant can be turned off at the retraction point so as to minimize the amount of direct spray. It is, therefore, often desirable to have a shutter 555 such as that shown actuated by air cylinder 560 connected to the control unit. Because of the rapid measurement using a flash which effectively freezes the position of the cutter within a few microseconds or less at even a several thousand RPM rotational rate, this shutter need stay open only a few milliseconds at most. Thus there is very little chance for contamination to get onto the lenses. It is noted that a shutter would like be desired for the flash source unit 505 as well. Besides shutter 555, air blowoffs or other cleaning means can also be used in conjunction, and it is particularly desirable to pressurize the area between the lens and the shutter such that when the shutter opens the outward surge of air from that area precludes anything from coming in. This has worked out effectively in practice.

One of the more interesting aspects of the invention is to look at the rear edge of something related to the cutter as in FIG. 7 while the cutter is rotating rather than just at one position as in the embodiment of FIG. 7. This can be done in a variety of ways. The first way is simply to use a multiplicity of diode arrays, radially disposed around an axis. This then would look just like the drawing of FIG. 7 but with diode arrays coming up radially from the paper every 10 degrees for example to form an approximation of a total circular monitoring system. For this to be effective, it requires in effect a pie shaped diode array unit with radial lines of elements. This can be obtained only on a special basis at the present time making it very expensive, although this may not be the case in the future. Certain types of television camera tubes can operate with radial scans, circumferentially rotated, but they are not well suited to plant applications.

Another possibility is to simply rotate the diode array unit with the boring tool. Obviously, however, this gets to be very difficult if the tool is in continuous 360° motion since it imlies the use of slip rings, etc. which are costly and prone to so many noise problems that it is not considered to be a satisfactory solution.

Figure 9:
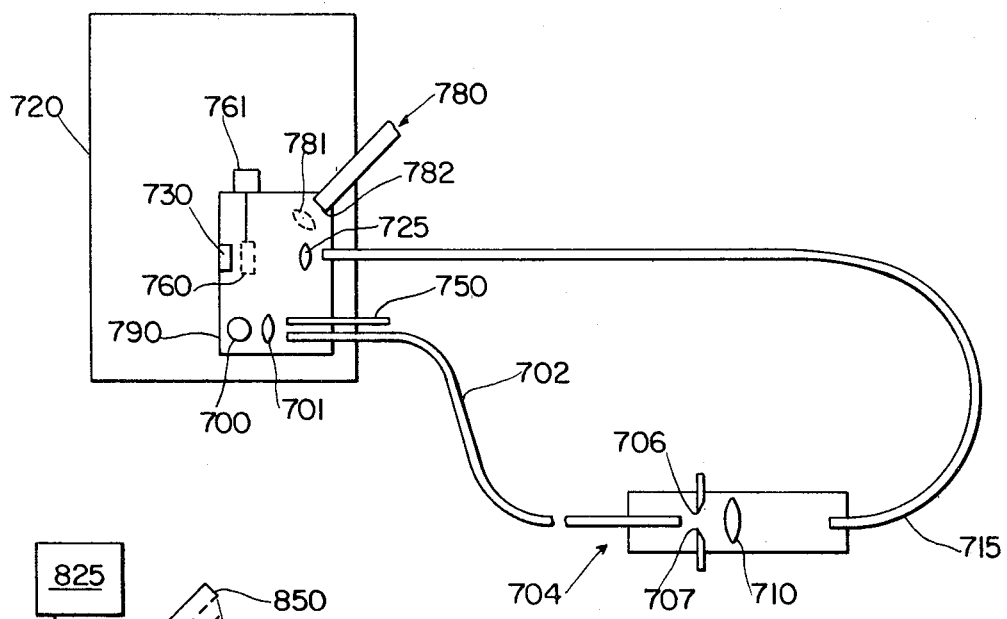
FIG. 9 is a diagrammatic side elevation view of a fifth embodiment of the invention.

The embodiments above have briefly described the use of fiber optics to provide a remote illumination source. FIG. 9 illustrates another embodiment of the invention utilizing fiber optic transmission with a light source and/or readout system remote from the actual measuring area. Use of such fiber techniques provides an easily mounted package in the measurement zone which can have great advantages in certain closely packed checking applications where multiple dimensions are to be checked within a small volume.

Another advantage of fiber optics in this application is that a centralized control unit can be built, servicing multiple heads with nothing else at each individual probe but the simple contact mechanisms and perhaps the light source or detector if one of these two are not remote. This allows for ease of service and allows for the time-sharing (so to speak) of a single lamp and detector unit amongst multiple sensor heads, potentially cutting the cost of the total pacakge. This cost factor is true only if the cost of the fibers is less than the cost of actually utilizing individual sources or detectors. This may or may not be the case at this time but all trends are in this direction.

Let us now consider FIG. 9. This illustrates a system in which both the light source unit and the sensing unit are indeed remote. In the case shown, a Xenon flash lamp 700 is focussed by lens 701 down into the fiber 702 going to the gage probe 704. This fiber optic illuminates the pin edges 706 and 707 from the rear, and a lens 710 in the probe images the light from the edges onto a second fiber optic 715 which brings the image back to the central control box 720.

It is of considerable interest to consider that the fiber bringing the light back must, of course, maintain the resolution of the edges if an accurate measurement is to be made. There are two types of fibers that can be used for this. The most common heretofore has been the use of coherent bundles of fibers and these can certainly be used here. In this case, the end of the bundle at the receiving end must be imaged for example with lens 725 onto a suitable image position detector, such as photodiode array 730.

The coherent bundles, however, are bulky, expensive and have considerable light losses due to the fiber designs and the fact that there are intersticial gaps between the fibers. They also have limited resolution because of these gaps.

Accordingly it is thought that the most desirable fiber in the long run is the guided wave single fiber rather than a bundle of individual clad multi-mode fibers. The guided wave fiber such as the selfoc type is presently only available in short lengths suitable for use with laser type sources which of course can be used in this case. Eventually, however, these will be available in white light form and capable of transmitting images with very high resolution at low cost. In this case, the lens 710 and the lens 725 are actually chosen to couple the images into and out of the fiber in such a manner as to transmit them onto detector array 730. In this case of course a single fiber rather than a bundle is used and it is noted that the position of both lenses 710 and 725 would not be the same as that in which one was trying to focus the edge images onto the end of fiber 715 and to image the other end of the fiber using lens 725 onto the array. Other than that the schematic diagram would be the same with the graded index type fibers as well as the bundles.

This same technique can be utilized with diffraction based sensing as well and the next drawing illustrates this case utilizing another type of sensor. Before proceeding, however, it is of interest to note that the system as shown in FIG. 9 can be used to monitor more than one sensor probe. For example, the light source 700 could feed a second sensor probe simply over fiber 750 for example. It is also entirely possible, for example, by using a square matrix photo diode array, to monitor the ends of fibers (not shown) from additional sensor probes using the same imaging lens 725.

Other ways of time sharing the multiple fibers from additional sensors extending out of the plane of the paper could be used much as single linear array 730 is used. In such a design, an oscillating mirror 760 driven by motor 761 could sweep the various images from the fibers past the linear diode array, making it act in effect like a matrix array of multiple columns.

Another possible way is to simply bring the fibers such as 780 in from different angles using a separate lens such as 781 to form in onto the diode array which itself would be decomposed slightly because of the angle of incidence but could still quite easily measure either the image produced or the fringes. In the case of an image, it would be desirable to cant the end of the fiber so that the edge would remain in focus on the array given the tilt angle. This end of the array is noted as 782.

It is of further use to consider that all of these elements can be located within a self contained box with a readout and that this is one of the big advantages of utilizing the fiber since this box such as box 790 can be the opto-mechanical structure and can be very rigid. It also saves money on the outer portions by providing a total package concept usable with a wide number of different sensor heads, etc. It is noted that once one goes to a fiber based system, the readout module such as box 790 becomes usable for any sort of transducer whose light can be carried over fibers. And this includes triangulating sensors, imaging array sensors and so forth.

Figure 10:
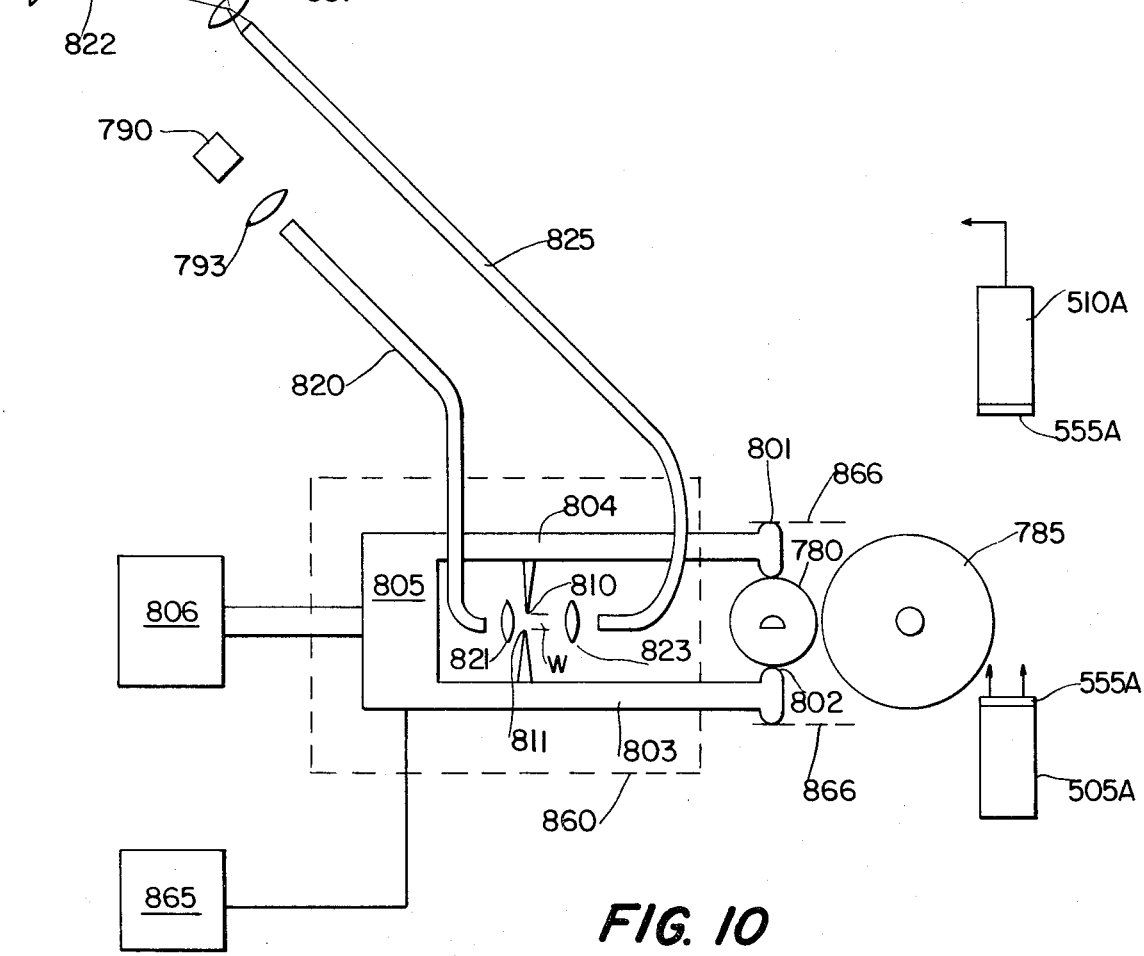
FIG. 10 is a diagrammatic side elevation view of a sixth embodiment of the invention.

FIG. 10 illustrates the use of the fiber system with a diode laser light source 790 feeding through a single wave guide fiber so as to preserve its coherence to a sensor utilized to measure the outer diameter of a wrist pin 780 on a grinder while the grinding wheel 785 is in operation. The contacts 801 and 802 are contacting the outer edge of the wrist pin 780. Arms 804 and 803 are rigidly connected to base 805 and contain edges 810 and 811 which are illuminated with laser radiation emanating from the end of single mode wave guide fiber 820 (i.e. SELFOC) and collimated by lens 821. The resulting diffraction pattern 822 due to edges 810 and 811 is directed into returning fiber 825 by lens 823 and imaged onto diode array 850 by lens 851. Analysis of the diffraction pattern fringe spacing "y" by readout 852 gives edge spacing "w" and thence is proportioned to the diameter of the wrist pin.

It is noted that in the FIG. 10 discussion to this point, the contacts are assumed to ride on the part 780 due to the taper on the contacts and the movement of mechanism 806. However, it is also noted that the arms 803 and 804 might also be, for example, piezoelectric bimorph or similar elements controlled by a voltage source 865 which can retract or expand toward the part as a function of applied signal. Control of such motion at high speed allows inspection of interrupted diameters on the fly, for example.

It is further noted that the same arrangement can also be used to gage inside diameters, etc. such as represented by surface 866 (dotted lines).

FIG. 10 also illustrates the in line monitoring of the grinding wheel position and/or form according to the invention, for the purpose of controlling the duration of grinding to achieve a given size and/or to determine if the wheel dressing. For this purpose, hardware equivalent to that of FIG. 8 is utilized, comprising light source 505A and sensor unit 510A having a linear or matrix photodiode array readout of wheel edge location. Signals are fed to a controller which then provides a signal to the wheel positioning control (not shown) to move it toward the part or away from the part for part change or wheel dressing.

It is further noted that these same machines control concepts that can be provided in other operations such as internal grind of bearing raceways and boring of cylinder bores, etc.

As in FIG. 8, a shutter and/or an air pressure unit 555A is provided to keep the windows clean during the process and during the relatively instantaneous period of the check.

Figure 12A:
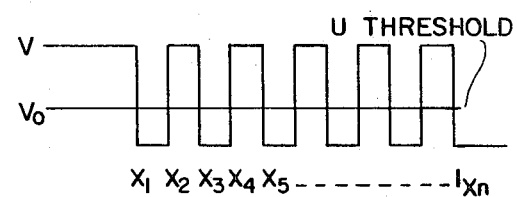
FIG. 12A is graphical representation of data in a threshold detection system in accordance with the invention.
Figure 12:
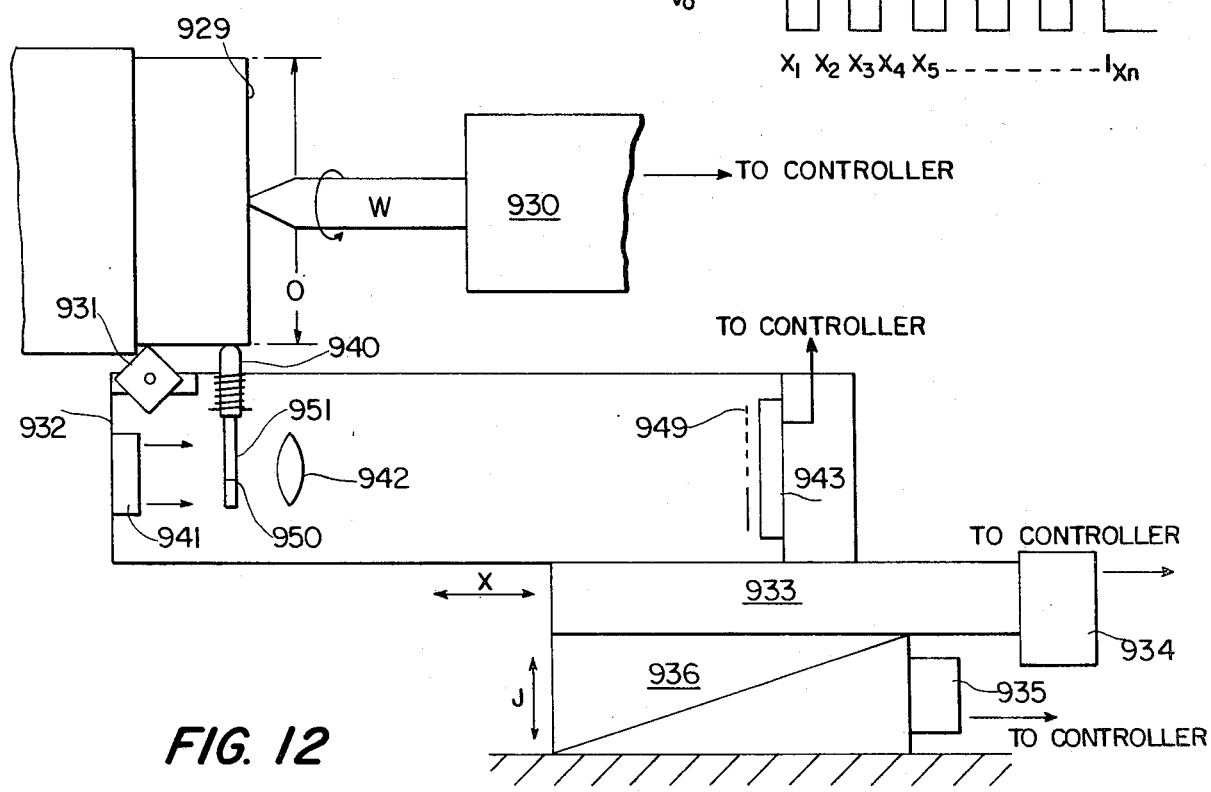
FIG. 12 is a diagrammatic side elevation view of an eighth embodiment of the invention.

It is noted that the concepts above have described the monitoring of cutter positioning for part size during or after machining, It is, however, of interest to consider the use of built-in gage member probes 416 such as shown in FIG. 7 or probes 940 in FIG. 12 to check a part size before commencing machining. In the case of FIG. 7, the cutter (i.e. 402) would be retracted (for example by a draw bar not shown) and the probe enters a bore of unknown size. The readout of the built-in probe position is fed back to set the cutter at the proper position for the most economic first cut. The cutter position can be checked as to proper setting by the embodiment of FIG. 8.

Figure 11:
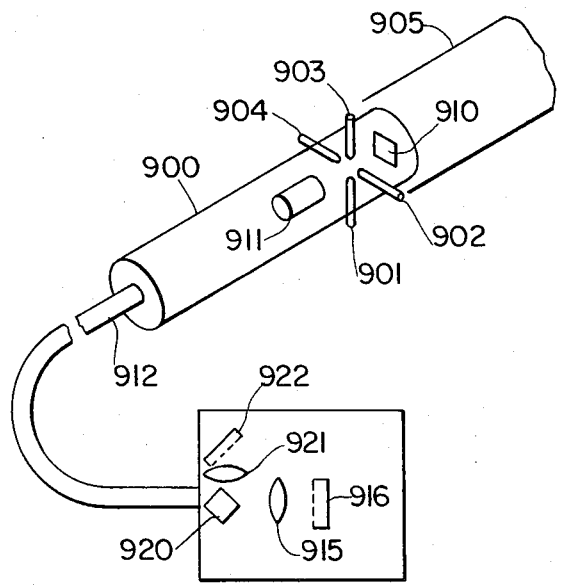
FIG. 11 is a diagrammatic perspective view of a seventh embodiment of the invention.

FIG. 11 illustrates another version utilizing fiber based readout. In this case a bore probe or 'plug' 900 comprises four contact pins 901–904, each contacting a bore wall 905 at 90° increments. An LED light source 910 is used and lens 911 images the inner edges of the contact members onto coherent fiber bundle 912 with about 10× magnification.

At the other end of the bundle, the resulting transmitted image of inner edges of contact pins 901 and 903 are imaged by lens 915 onto photodiode array 916, and pin edges 902 and 904 are imaged via beam splitter 920 by lens 921 onto array 922. Analysis of outputs of array 922 and 916 gives the ovality and out of roundness of the bore 905, as well as the diameter in two planes. This is a very desirable result, in a very compact package.

It is noted that the result can also be achieved using diffraction readout and by replacing LED 910 with a diode laser or similar quasi coherent source. In this case, lens 911 is used to focus the pattern onto the fiber end and arrays 916 and 922 to interrogate the matter.

Now consider FIG. 12. This illustrates control of a turning operation in which a titanium work piece 929 is rotated at velocity by a motor and spindle 930, and turned to diameter D by cutter insert 931 on bar 932 attached to slide 933. Feed rate is controlled by a motor 934 and tool position by a motor 935 acting on inclined planes 936 via a screw mechanism not shown.

Pin 940 contacts the part surface and the rear edge(s) of the pin are illuminated by the LED sources 941 and the edge image(s) framed by lens 942 on diode array 943. Blown air or shield means to keep chips and coolant off pin 940 where necessary are not illustrated for clarity.

In this embodiment a microprocessor based controller (not shown) is used to monitor and control the tool position, feed and speed rates as a function of data obtained from pin 940 regarding the dimension of the part and changes therein (due to chatter, etc.). At this point it is of interest to discuss various circuits which can be used to determine image edge position of the contact members. The single edge per pin case is similar to that discussed in my copending U.S. application Ser. No. 269,614, the disclosure of which is hereby incorporated by reference As noted therein, a multiple threshold circuit can be used. This can yield up to 10× additional magnification—a very important point where high resolution is desired.

Of added interest is the use, shown in FIG. 12, of multiple edges to increase resolution. Obviously, if one tracks the image 949 of the edge 950 of the grid 951 only, the case is like that described above. However, the use of additional edges spaced a constant distance apart provides an additional degree of resolution without resorting to drift prone multiple analog thresholds or even vernier or phase comparison techniques. For example, if there are 20 bars in grating 951 on 0.002" centers, a 10:1 impage produced by lens 951 occupies 0.400" on array 960 which is a one inch Reticon 1728H type having elements on 0.006" centers. At 10:1, the pin 970 can move 0.060" and still keep all edges on the array.

Now, the payoff in this is the resolution of defining where the pin is. Normally in a single threshold system, it would be 10 (the lens magnification) times the array spacing or 0.00006". However, in this case, the pin edge is taken to be the *average* of all 20 edges (or really 40 as each side of a bar can be counted). If the period of the grid as imaged by the lens (i.e. a line space 80.002 becomes 0.020" on the array at 10×) is a prime number insofar as the array inter-element spacing is concerned, then in general the resolution of the average is improved 40 times even with a single array threshold voltage vo.

$$\text{Ave. Position} = \sum_{n=1}^{40} X_n/40$$

where $x_n$ is the detector array element number on which an edge crosses the threshold Vo.

This averaging procedure also tends to cancel out inter-element sensitivity differences.

Finally it is noted that the embodiments above show a contact actually touching the surface to be measured. This contact condition can indeed be monitored using electric current flow or other suitable means. It is within the realm of the invention to determine size even if the member is not in contact but a known distance away. In other words, a compact air unit could be provided to indicate that a pin was not in contact by a certain amount.

In addition it is noted that accuracy improvements can be made by simply taking a plurality of readings of the same position and dividing the number. This eliminates random fluctuations.

Figure 13:
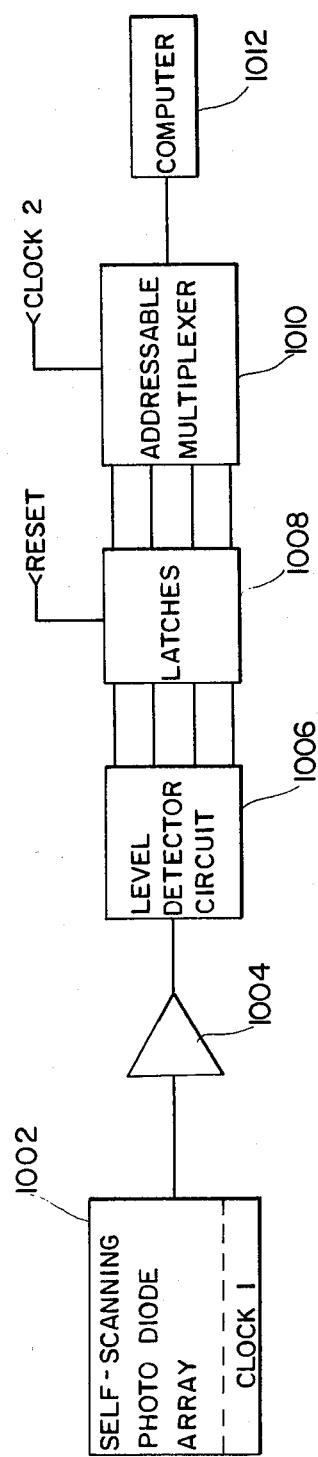
FIG. 13 is a schematic block diagram of one embodiment of an analyzing means in accordance with the present invention.

With reference to FIG. 13, an array output circuit is disclosed for analyzing the output signals from the light sensitive elements, such as photodiodes, of an array 1002. In conventional circuits, due to the limitation from the finite size of the light sensitive elements, the position of an edge of an image cannot be detected to a greater accuracy than one element. However, by using multiple theshold circuitry techniques with light sensitive elements that produce an analog video output that varies with the intensity of the incident illuminating, the position accuracy can be increased to a fraction of the spacing between adjacent elements. The particular fraction is determined by the number of thresholds used.

Photodiode array 1002 is a conventional, self-scanning array that has a predetermined number of photodiodes with a known spacing therebetween. Each photodiode is sequentially, individually scanned and produces an analog output signal such as a voltage. This video output signal is fed through a video buffer 1004 to a multiple level detector circuit 1006. Level detector circuit 1006 can be comprised of a plurality of conventional, differential, operational amplifiers (such as LM 301's) connected in parallel to the output of buffer 1004 through a chain of voltage dividing resistors set the respective level for the amplifiers.

The output signals from level detector circuit 1006 are binary signals equal in number to the desired number of thresholds. The output signals from level detector circuit 1006 are latched in corresponding latches 1008 (which can be conventional D-type flip-flops in IC 7474). Each latch is cyclically interrogated by an addressable multiplexer 1010 at a rate that is a multiple of the array clock equal to the number of thresholds. Multiplexer 1010 can be a conventional digital multiplexer (such as IC 74153) that is sequentially addressed by a binary counter (such as IC 7493) clocked at the multiple rate.

In the example depicted in FIG. 13, four thresholds are used. Thus, there are four outputs from level detector circuit 1006, four latches 1008, and four inputs to addressable multiplexer 1010. Also, the rate of clock 2, which clocks addressable multiplexer 1010, is four times the rate of clock 1, which clocks array 1002.

The output from addressable multiplexer 1010 is a stream of pulses or a pulse train having a frequency that is the multiple of the number of thesholds times the array clock (a frequency of four times the array clock for the present example). The pulse train is fed to the input of a computer 1012. In one example, computer 1012 simply can be a conventional totalizing counter. In another example, computer 1012 can be a programmed calculator that continuously computes and displays the dimension being measured. In a further example, computer 1012 can determine the position of an edge projected onto array 1002 as being the half way point on the slope in the light-to-dark transition zone.

At the beginning of each scan, latches 1008 are reset or cleared. During the scan time, when the video signal reaches a particular threshold level, the corresponding latch 1008 is set. The continuously scanned multiplexer 1010 thus produces a count pulse for each latch that has been set high on each of the scan sequences.

Finally FIG. 14 illustrates use of a canted matrix array to improve resolution of edges utilized in this invention. As shown, the image 1100 of the edge 1101 on the opposite end of contact point 1102 contacting surface 1103, is imaged by lens 1106 onto matrix array 1110. In this application, however, light source 1120 is relatively broad and the edge image 1100 occupies a considerable extension in space along the axis of the edge itself (y axis). Note that the edge image extension in the y direction should be such that edge covers the total width of the array in the y direction at all times.

For edge image detection, this embodiment discloses use of a matrix diode array which is canted slightly relative to the edge image at cant angle $\phi$. This angle is kept very small such that at a fixed threshold detector voltage value of $V_o$, the detected edge image moves down each line of the array, let us say line 1 through 128 on a 128 line array before it recirculates to trip the next detector in the first line. This creates a type of vernier for the array and vastly increases the resolution.

It is noted that either the array can be tilted relative to the direction of motion of the edge which is the more normal case or conversely the array can be positioned in the direction of edge motion and the edge 1101 itself tilted (direction of motion in x direction). Either approach gives the desired results namely that as the edge moves, the detectors in each row but of the same column number successively see the edge image cross their fixed threshold.

As shown in the figure, one mode of interrogating such a system is to count via counter 1135, the number of detectors which are 'dark' (ie. below the threshold voltage $V_o$) in the matrix array. This number is proportional to the value on all detectors at once in each column, for example a 100×100 element array has 10,000 detectors dark (ie. below $V_o$). If at a first edge position one row has 11 where all the other rows have 10 dark. The count total is 1001. If however the point moves just slightly into the light field, ie. in the positive x (vertical) direction, then the detector count in each of the first two rows goes to 11 with 10 in the rest. This ups the count total to 1002.

The effective resolution improvement is 100×, and a simple divider circuit 140 provides 2 extra decimal places of resolution in the answer as shown.

It is noted that larger offset angles $\phi$ can be used if suitable additional calculation is provided. However $\phi = 1/n$ where n is the number of elements in the array row is preferred.

Optionally, this same circuit can be obtained using a reference edge 1130 as shown in dotted lines. In one case the reference edge is either parallel to the array or canted at a different angle to the array. In addition both edges may move as in FIG. 1. In both cases two edge images are seen on the array.

This resolution improvement invention can be extended to sensing of images of parts. For example, let us consider that the edge image 1100 coming from edge 1101 is instead created by the image of a cylindrical object such as a roller bearing 1150 (shown in the dotted lines).

It is noted that in this embodiment also one may use diffraction patterns of the edges obtained if light source 1120 is a laser. The same resolution improvement results but additional circuitry is required to average the fringe count, since multiple fringes are usually on the array, not just one (which would be similar to an edge image). In this case each fringe undergoes such a resolution increase, and the count output is equal to the number obtained above times the number of fringes present.

To produce the diffraction fringes one would require two edges, for example reference 1130 and contact edge 1101, or the edge of part 1150.

Finally, it is again noted that in any of the embodiments described herein, that no physical connection need exist between the contacts forming the edges and the readout system. This has been discussed relative to rotation of the contact (FIG. 7) but also can be of interest relative to their linear translation along the optical axis separating the contact probe and the optical image or diffraction pattern sensing diode array.

For example, consider FIG. 1. Probe housing 21 might be limited to only the small zone around the contacts 18 and 19, and not physically connected to the readout section 12. To probe the bore of part 15, this section 21 could be moved in and out while readout 12 remains fixed.

In so doing, one must compensate, in the diffraction case fpor variation in edge to array readout distance R. The value for such compensation is immediately available from the bore probe position along the bore axis. In imaging systems the problem is that the edge definition changes due to depth of field changes and this must be compensated—a more difficult task.

The last embodiment of this invention shows another version of the tool inspection configuration shown in FIG. 8. The basic sensing unit such as sensor 513 with flash light source 505 are again utilized, this time however in order to inspect the condition and determine the location in space of a variety of interchangeable tools on a machining center.

Consider FIG. 15. This shows in block form a typical machining center such as a Kerney & Trecker Milwaukee-Matic "Moduline" travelling table machine. This machine as is typical of many machining centers has a vertically moving spindle with a horizontally moving table. The whole column itself moves in and out in the z axis (out of the plane of the drawing).

A tool changer is often provided with these machines. The machine retracts back to the tool change location and an automatic arm interchanges the new tool with the tool just utilized which is put back into a magazine.

It is at this tool change location that perhaps the ideal change for inspection occurs since the machine must go to this location at every tool change and therefore almost every operation. Because the machine axes are slow, eg. 200 ipm max) it is desirable to provide high speed axis on the sensor head to move it into place at the tool change location in order to make the measurement. This provides the absolute minimum of disruption of machine cycle associated with the inspection. Since a typical inspection of a tool such as a drill, tap, reamer, boring bar, facing mill etc. may take only a second or two, the actual disruption is in virtually all cases less than 5 seconds including the in/out time of the sensor unit to clear the tool change operation.

As shown, the sensor unit 1200 is moveable in and out on x axis slide 1201 attached to machine upright 1202 or alternatively the tool changer, etc. (eg. location 1204 dotted lines). When the spindle 1205 is in the position for a tool change into magazine 1210, the x axis slide is activated bringing the sensor unit in so as to be in a position to illuminate the critical edges of the tool in question for example, edge zone 1220 of cutter insert 1221 in boring bar 1222.

At this particular location, when the optical sensor unit is in place an optional air line 1230 is utilized to blow off any chips or coolant etc. from the tool. This air line can be provided as shown on the sensor unit or it can be provided separately. Any coolant lines etc. flooding the tool are normally turned off during the measurement.

As shown in the diagram, the tool can be rotating or stationary during the time of measurement. If the tool is rotating it is highly desirable to utilize in most cases at least, flashed light source such as 1235. This flashed light source is cued by either a shaft encoder on the spindle (not shown for clarity) or a part position sensor such as tripped by using light source 1236 and detector 1237 in order to sense the portion of the tool desired as it comes around into view. This is particularly easy to see on the single point tool shown however, on any particular tool could be designed such that a tool holder for other portion had a suitable flag such as shown in FIG. 8, item #521 in order to provide this indication. For example a flag could actually be composed of a indented portion of the tool which would cause light to be lost that would be reflected off of it. This could be simply a hole such as hole 1240 drilled into the boring bar shown which would then be sensed by a sensor specifically for such a cueing hole 1245 shown on the end of the sensor head. There are inumerable different ways of phasing the flash gun in order to catch the tool at the correct location. Indeed many machining centers have keyed tool locators allowing easy use of rotational encoders.

The sensing can be easily provided herein by utilizing solid state matrix array 1250 on whose face the image of the tool edge zone 1220 is formed by lens 1252 acting through mirror 1255.

In the version shown, the matrix diode array might typically have a 250×250 element array which would be imaged on a 1 to 1 basis roughly to look at a ¼″ square zone of the tooling. This is usually quite ample in order to totally define a cutter's radial location in space as well as the length of tooling, the contour of taps etc. The resolution nominally is 0.001 inch of this unit with a fixed threshold and for this reason resolution extension such as described relative to FIG. 13 and other circuits is highly desirable in order to improve the resolution to at least 0.001 inch or better.

There is another important thing to notice for utmost flexibility in inspection of these tools. We must ask the question is the ¼″ measuring zone enough and are all the tools at the same place? Clearly, if the tools that are fed from the changer into the tool holder are of varying length the travelling column in its z axis motion will have to stop at a position which is not the actual tool change location in order to accomplish the measurement. This does not lose much cycle time since it has to go through that position anyway but it is obvious that one might also provide this motion by having a z axis slide such as 1270 in order to move the sensor unit in and out to accommodate the different lengths in tools.

Of considerable further interest is the thought of actually using the z axis motion to accomplish a scan of the tool in the z axis, ie. the tool longitudinal axis. In this case, one can consider a linear diode array as opposed to the matrix array, such as linear array shown in dotted lines 1280 in the figure. In this case, one could for example stop the rotational motion and use a continuous light source 1235 and simply scan the linear array down the axis of the tool therefore reading in thousands upon thousands of lines of information concerning the shape, length, etc. of the tool. This is particularly advantageous for example in contouring taps for thread form etc.

This also would be of considerable use since the linear array can have typically far greater range—an order of at least 8 times higher range for example which would allow it to cover let us say up to a 2 inch field of view which would allow whole diameters of drills, taps etc. to be sensed at once. It shoulde be noted that the combination of the higher range in the x axis produced by the linear array plus the obvious huge range of the encoders on the machine's mechanical z axis, (or the optional sensor z axis) would allow contouring of virtually any size tool as well as the accurate contouring of face mills whose cutting edges are facing forward as opposed to the side as in the figure shown. It should be noted that face mills can be handled with the matrix array system but the resolution enhancement is often provided best only in one axis and does not become as effective for the face mill case.

Naturally the disadvantage of the linear diode array system is that it is slow since it generally requires mechanical motion to be made. Furthermore, if the tool was rotating, it cannot take in a whole 2 dimensional field of view in a flash but would instead require a large number of rotational cycles in order to read in a large number of data points at strobe locations in the z axis.

While a profile image type of sensor has here been described, the concept of such tool inspection can also be accomplished with triangulating type sensors such as those described in a copending application U.S. Ser. No. 34,278, filed Apr. 30, 1979. These sensors utilize images of reflected light from the part and are in general more expensive relative to the one shown in FIG. 15, for any given range and resolution. However, certain tool forms could be best sensed with such a sensor and use of same is considered part of this invention.

The provision of such sensing equipment on machine tools should offer a completely new capability to such tools in allowing their unattended operation with no concern over improper tool setting, tool damage which can result from hitting porosity etc. in bores, and all the other maladies that affect quality of machine products on computer controlled machines. It is the final link in the loop and allows accurate prediction when tools should be changed resulting in increased productivity due to optimizing tool life etc.

What is claimed is:

1. Apparatus for working an object with a tool comprising:
    means for supporting an object in a working position to be worked on by a tool;
    a tool for working on the object;
    means for monitoring a dimension of said object being worked on during normal operating of the apparatus comprising a member adapted to contact a surface being worked, said member comprising an edge located remote from the point at which said member contacts a surface being worked;
    means for monitoring a dimension or position of said tool during normal operation of the apparatus comprising an edge provided on said tool at a point remote from the point at which said tool contacts a worked-upon surface;
    said object monitoring means and said tool monitoring means comprising means for directing electromagnetic radiation onto said edges, electromagnetic radiation detector means comprising a plurality of discrete electromagnetic radiation sensitive elements disposed in an array, each element being capable of producing an output signal in response to incident electromagnetic radiation, lens means for focussing images of said edges on said light detectors, and means for analyzing the output signals from said radiation sensitive elements to monitor a dimension of a surface being worked upon and to monitor a dimension or position of said tool.

2. Apparatus according to claim 1 wherein said analyzing means comprises means for simultaneously analyzing said signals to monitor said surface and said tool simultaneously.

3. Apparatus according to claim 1 wherein said tool comprises a cutting tool.

4. A method for working an object with a tool comprising:
    supporting an object in a working position to be worked on by a tool;
    working on the object with a tool;
    providing means for monitoring a dimension of said object being worked on during normal operation of the apparatus comprising a member adapted to contact said surface being worked, said member comprising an edge located remote from the point at which said member contacts said surface being worked;
    providing means for monitoring a dimension or position of said tool during normal operation of the apparatus comprising an edge provided on said tool at a point remote from the point at which said tool contacts said worked-upon surface;

said object monitoring means and said tool monitoring means comprising means for directing electromagnetic radiation onto said edges, electromagnetic radiation detector means comprising a plurality of discrete electromagnetic radiation sensitive elements disposed in an array, each element being capable of producing an output signal in response to incident electromagnetic radiation;

utilizing lens means to focus images of said edges on said light detectors, directing electromagnetic radiation onto said edges; and analyzing the output signals from said radiation sensitive elements to monitor a dimension of a surface being worked upon or to monitor a dimension or position of said tool.

5. A method according to claim 4 wherein said analyzing step comprises simultaneously analyzing said signals to monitor said surface and said tool simultaneously.

6. A method according to claim 4 wherein said tool comprises a cutting tool.

7. A method according to claim 4 wherein said tool comprises a grinding tool.

8. Apparatus for determining a dimension of an opening in an object comprising:

a housing comprising an elongate probe tube adapted to be inserted into an opening of a positioned object said tube having an opening adjacent its distal end;

a gage member mounted within said elongate probe tube, said gage member being movable through said opening and having a contact portion for contacting a surface of an object positioned such that said surface can be contacted thereby and having a non-contact portion movable with said contact portion and comprising an edge, said edge comprising a plurality of longitudinally spaced edges, said spaced edges being spaced apart known distances from one another at progressively increasing intervals on said gage member;

means for positioning said gage member in a contact position in which said contact portion is in contact with a surface of a positioned object, the position of said edge being proportional to a dimension of the object between a reference point of said positioned object and the surface of said positioned object contacted by said contact portion of said gage member;

light source means for directing light onto said edge;

light detector means mounted within said housing comprising a plurality of light sensitive elements, each of said light sensitive elements being capable of producing an output signal in response to incident light;

lens means mounted within said housing for focussing an image of said edge on said light detector means, said image being formed by the light directed onto said edge and comprising an image of said plurality of edges; and means for analyzing the output signals from said light sensitive elements to determine the dimension between the reference point and said surface of a positioned object, said analyzing means comprising means for detecting the magnitude of the spacing between the images of two adjacent edges.

9. Apparatus for determining a dimension of an opening in an object comprising:

a housing comprising an elongate probe tube adapted to be inserted into an opening of a positioned object, said tube having at least two openings adjacent its distal end;

a first gage member mounted within said elongate probe tube, said first gage member being movable through one of said openings and having a contact portion adapted to contact a first surface portion of an object positioned such that said first surface portion can be contacted thereby and having a non-contact portion movable with said contact portion and comprising an edge, said edge comprising a plurality of longitudinally spaced edges, said spaced edges being spaced apart known distances from one another at progressively increasing intervals on said first gage member;

a second gage member mounted within said elongate probe tube, said second gage member being movable through a further one of said openings and having a contact portion adapted to contact a second surface portion of an object positioned such that said second surface portion can be contacted thereby and having a non-contact portion movable with said contact portion and comprising an edge, said edge comprising a plurality of longitudinally spaced edges, said spaced edges being spaced apart known distances from one another at progressively increasing intervals on said second gage member;

means for positioning said first and second gage members in an object-contacting position in which said contact portions of said first and second gage members are in contact with first and second surfaces of said positioned object whereby, when said first and second gage members are in said object-contacting position, said edges of said first and second gage members are spaced apart a distance proportional to the distance between, on the one hand, the point of contact between said first gage member and first object surface and, on the other hand, the point of contact between said second gage member and said second object surface;

light source means for directing light onto said edges;

light detector means mounted within said housing comprising a plurality of light sensitive elements, each of said light sensitive elements being capable of producing an output signal in response to incident light;

lens means mounted within said housing for focussing an image of said edges on said light detector means, said image being formed by the light directed onto said edges and comprising an image of said plurality of edges; and means for analyzing the output signals from said light sensitive elements to determine the dimension between said two surfacs of said object, said analyzing means comprising means for detecting the magnitude of the spacing between the images of two adjacent edges.

10. Apparatus for determining a dimension of an object comprising:

a gage member having a contact portion for contacting a surface of an object positioned such that said surface can be contacted thereby and having a non-contact portion movable with said contact portion and comprising a plurality of edges spaced apart at progressively increasing intervals;

means for positioning said gage member in contact position in which said contact portion is in contact with said surface of said positioned object, the position of said edges being proportional to a dimension of the object between a reference point of said positioned object and the surface of said positioned object contacted by said contact portion of said gage member;

light source means for directing light onto said edge;

light detector means comprising a plurality of light sensitive elements, each of said light sensitive elements being capable of producing an output signal in response to incident light;

lens means for focussing an image of said edges on said light detector means, said image being formed by the light directed onto said edges; and means for analyzing the output signals from said light sensitive elements to determine the dimension between the reference point and said surface of a positioned object, said analyzing means comprises means for detecting the magnitude of the spacing between the images of two adjacent edges.

11. Apparatus for determining a dimension of an object comprising:

a first gage member having a contact portion adapted to contact a first surface of an object positioned such that said first surface can be contacted thereby and a non-contact portion movable with said contact portion and comprising a plurality of edges spaced apart at progressively increasing intervals;

a second gage member having a contact portion adapted to contact a second surface of said object positioned such that said first surface can be contacted thereby and a non-contact portion movable with said contact portion and comprising a plurality of edges spaced apart at progressively increasing intervals;

means for positioning said first and second gage members in said object-contacting position in which said contact portions of said first and second gage members are in contact with first and second surfaces of said positioned object whereby, when said first and second gage members are in said object-contacting position, said plurality of edges of said respective first and second gage members are spaced apart a distance proportional to the distance between, on the one hand, the point of contact between said first gage member and first object surface and, on the other hand, the point of contact between said second gage member and said second object surface;

light source means for directing light onto said edges;

light detector means comprising a plurality of light sensitive elements, each of said light sensitive elements being capable of producing an output signal in response to incident light;

lens means for focussing an image of said edges on said light detector means, said image being formed by the light directed onto said edges; and means for analyzing the output signals from said light sensitive elements to determine the dimension between said two surface of said objects, said analyzing means comprises means for detecting the magnitude of the spacing between the images of two adjacent edges.

12. A method for determining a dimension of an object comprising:

providing a gage member having a contact portion for contacting a surface of an object positioned such that said surface can be contacted thereby and having a non-contact portion movable with said contact portion and comprising a plurality of edges, said edges being spaced apart at progressively increasing intervals;

positioning said gage member in a contact position in which said contact portion is in contact with said surface of said positioned object, the position of said edges being proportional to a dimension of the object between a reference point of said positioned object and the surface of said positioned object contacted by said contact portion of said gage member;

directing light onto said edge;

providing a light detector means comprising a plurality of light sensitive elements, each of said light sensitive elements being capable of producing an output signal in response to incident light;

utilizing lens means to focus an image of said edges on said light detector means, said image being formed by the light directed onto said edges; and analyzing the output signals from said light sensitive elements to determine the dimension between the reference point and said surface of a positioned object, said analyzing step comprising detecting the magnitude of the spacing between the images of two adjacent edges.

13. A method for determining a dimension of an object comprising:

providing a first gage member having a contact portion adapted to contact a first surface of an object positioned such that said first surface can be contacted thereby and a non-contact portion movable with said contact portion and comprising a plurality of edges, said edges being spaced apart at progressively increasing intervals;

providing a second gage member having a contact portion adapted to contact a second surface of said object positioned such that said first surface can be contacted thereby and a non-contact portion movable with said contact portion and comprising a plurality of edges, said edges being spaced apart at progressively increasing intervals;

positioning said first and second gage members in said object-contacting position in which said contact portions of said first and second gage members are in contact with first and second surfaces of said positioned object whereby, when said first and second gage members are in said object-contacting position, said plurality of edges of said respective first and second gage members are spaced apart a distance proportional to the distance between, on the one hand, the point of contact between said first gage member and first object surface and, on the other hand, the point of contact between said second gage member and said second object surface;

directing light onto said edges;

providing light detector means comprising a plurality of light sensitive elements, each of said light sensitive elements being capable of producing an output signal in response to incident light;

utilizing lens means to focus an image of said edges on said light detector means, said image being formed by the light directed onto said edges; and analyzing the output signals from said light sensitive elements to determine the dimension between said two surfaces of said object, said analyzing step comprising detecting the magnitude of the spacing between the images of two adjacent edges.

14. Apparatus for working on an object with a cutting tool comprising:
- a cutting tool for working on an object, said cutting tool having a cavity therein;
- a member secured to said cutting tool such that said member moves with said tool relative to an object worked on by said tool, said member having a portion located within said cavity in said tool and remote from the cutting edge of said cutting tool;
- means for directing electro-magnetic radiation onto said portion of said member;
- means for monitoring the position of said portion of said member, said monitoring means being located remote from said tool and comprising electro-magnetic radiation detector means capable of producing an output signal in response to incident electro-magnetic radiation, and lens means for forming an image of said portion on said detector means, and
- means for analyzing the output signal from said radiation detector means to monitor the position of said portion of said member.

15. Apparatus according to claim 14 wherein said apparatus further comprises means for inspecting said cutting edges of said cutting tool.

16. Apparatus according to claim 15 wherein said cutting edge inspecting means is positioned to inspect said cutting edge when said cutting edge is out of contact with said object.

17. Apparatus according to claim 14 wherein said analyzing means comprises means for analyzing said output signal when said tool is cutting said object and when said tool is withdrawn from said object.

18. A method of working on an object with a cutting tool comprising:
- providing a cutting tool for working on an object, said cutting tool having a cavity therein;
- providing a member rigidly secured to said cutting tool such that said member moves with said tool relative to an object worked on by said tool, said member having a portion located within said cavity in said tool and remote from the cutting edge of said cutting tool;
- providing monitoring means for monitoring the position of said portion of said member, said monitoring means being located remote from said tool and comprising electro-magnetic radiation detector means capable of producing an output signal in response to incident electro-magnetic radiation, and lens means for forming an image of said portion on said detector means;
- directing electro-magnetic radiation onto said portion of said member; and
- analyzing the output signal from said radiation detector means to monitor the position of said portion of said member.

19. A method according to claim 18 wherein said method further comprises inspecting said cutting edge of said cutting tool.

20. A method according to claim 19 wherein said cutting edge is inspected when said cutting edge is out of contact with said object.

21. A method according to claim 18 wherein the output signal from said radiation detector is analyzed when said tool is cutting said object and when said tool is not cutting said object.

22. Apparatus according to claim 18 wherein said tool comprises a grinding tool.

* * * * *